United States Patent

[11] 3,579,181

[72] Inventor Frank Massa
 Cohasset, Mass.
[21] Appl. No. 824,407
[22] Filed May 14, 1969
[45] Patented May 18, 1971
[73] Assignee Massa Division Dynamics Corporation of America
 Hingham, Mass.

[54] SONAR RANGING SYSTEM FOR LOCATING SUBMERGED OBJECTS
 9 Claims, 4 Drawing Figs.
[52] U.S. Cl. .................................................. 340/3-R, 340/6-R
[51] Int. Cl. ...................................................... G01s 9/66
[50] Field of Search ........................................... 340/1, 3, 3 (E), 6, 16; 343/7.5

[56] References Cited
UNITED STATES PATENTS
2,867,788 1/1959 Harry .......................... 340/3X
3,160,850 12/1964 Dudley ........................ 340/6

Primary Examiner—Richard A. Farley
Attorney—Louis Bernat

ABSTRACT: A pair of narrow-beam directional transducers are mechanically joined together to radiate sonic energy in angular directions which are fixed with respect to each other. Electrical switching means cause the individual transducers to sequentially radiate bursts of sonic energy. Each of the transducers picks up the reflected sonic energy, and electronic means ascertains the azimuth of the object reflecting the energy, responsive to the relative strength of the signals picked up by the two transducers.

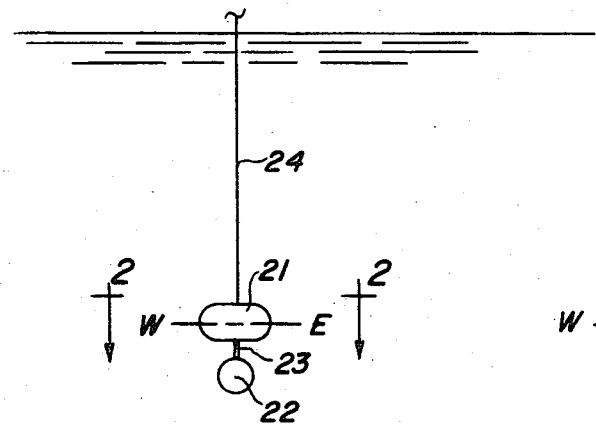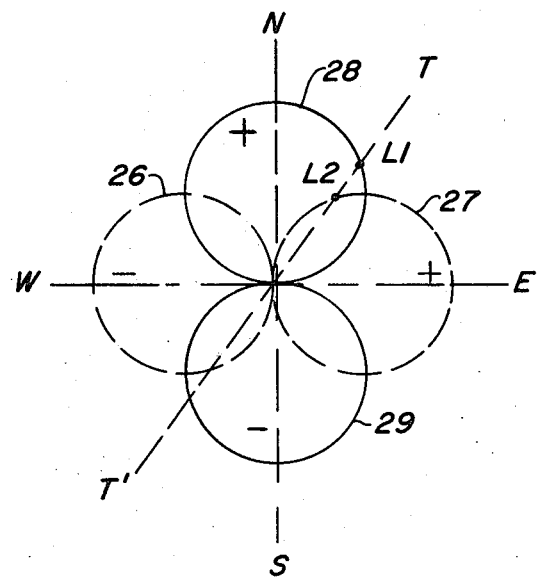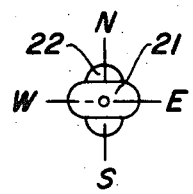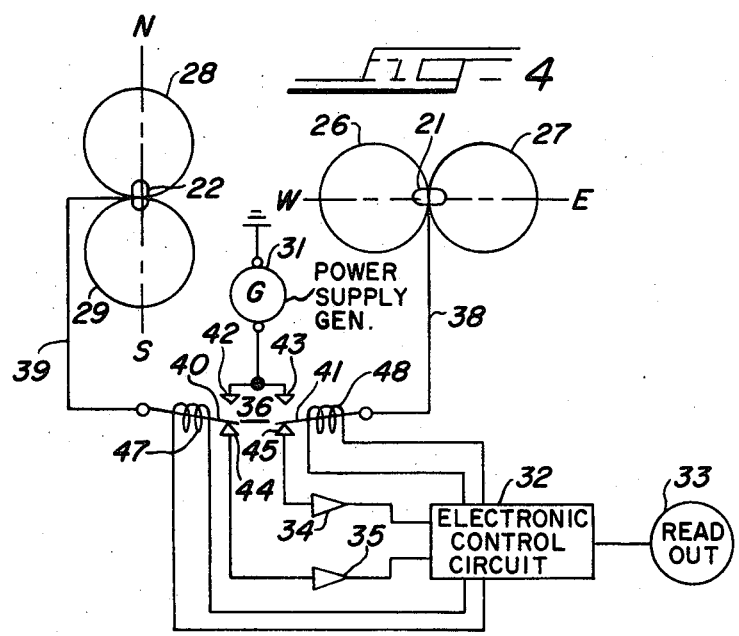
INVENTOR.
FRANK MASSA

SONAR RANGING SYSTEM FOR LOCATING SUBMERGED OBJECTS

This invention relates to active sonar ranging systems, and more particularly to simple, electrically controlled means for detecting the direction of a submerged object which reflects sonic energy.

There are many sonar ranging systems of varying complexity. Some of the simpler systems are directional sonar transmitting transducers which rotate to scan with a relatively sharp, searchlightlike pattern. While this system is relatively simple, it is also very slow.

A more sophisticated sonar system uses multielement arrays of omnidirectional sonar devices which are pulsed to send out sonic tone bursts. A delay line is connected to the array via a commutator switch. This way, electronic means may control the system to provide a narrow band scanning system for obtaining virtually instantaneous target information. However, this sophisticated system is both complex and expensive.

Systems of intermediate complexity sometimes use omnidirectional sound generators in combination with directional receivers. The receivers may have two dipoles mounted with their maximum sensitivity axes extending perpendicularly, with respect to each other. Here the echoes received by the two transducers are compared with each other to ascertain the direction to the echo reflecting object. The problem here is that separate transducers are required for transmitting and receiving the sonic energy. Also, high power is required in order to obtain a good signal-to-noise ratio.

Accordingly, an object of this invention is to provide new and improved active sonar ranging systems. More particularly, an object is to improve the efficiency of underwater sonar ranging systems. Here, an object is to provide simple and inexpensive systems using two identical transducers which operate in the audible frequency range. In this connection, an object is to require only two dipole sound generators which operate without baffles.

Another object of the invention is to provide simple and reliable electrically controlled sonar ranging systems. Yet another object is to select the one of two transducers which receives the stronger echo. Here, an object is to compare the ratio of the strength of signals received by two mutually perpendicular hydrophones and to derive therefrom the direction of a reflecting object.

Yet another object of the invention is to provide a simple method for making long range detection of underwater objects. Here, an object is to improve the signal-to-noise ratio of simple sonar systems. A further object is to automatically send all available power in the direction of a selected object.

In keeping with an aspect of this invention, two dipole transducers are used for both transmitting and receiving sonic energy. These two transducers are mounted with their axes of maximum response extending outwardly in mutually perpendicular directions. Each transducer has a cosine directional pattern. Therefore, when used together, these two transducers provide a sonic energy pattern which is somewhat similar to the pattern of crossed dipole antennas. The electrical control system automatically selects the transducer receiving the strongest sonic echo that best satisfies the condition for obtaining the most favorable signal-to-noise ratio.

The nature of a preferred embodiment for accomplishing these and other objects may be understood best from a study of the following specification when taken in connection with the accompanying drawings, in which:

FIG. 1 is a vertical elevational, schematic representation of two underwater, sonar, dipole transducers mounted with their axes mutually perpendicular;

FIG. 2 is a plan view taken along the direction 2-2 of FIG. 1 and looking down upon the two transducers;

FIG. 3 graphically shows the superimposed cosine radiation patterns of two transducers which are mounted as shown in FIG. 1; and FIG. 4 is a schematic diagram which explains the electrical control means for automatically switching the output of a power supply to drive the particular transducer which provides acoustic energy in the best sonar detection pattern.

As best seen in FIGS. 1 and 2, a pair of sonic energy, dipole transducers 21, 22 are mounted to project their axes of maximum response outwardly in mutually perpendicular directions. Mechanically, these transducers are joined together by any suitable means, symbolically shown at 23. The mutual perpendicularity is indicated by the North-South line (N-S) and West-East line (W-E). These transducers are suspended underwater on the end of a cable 24. The cable contains all of the conductors which are necessary to control the transducers 21, 22.

The transducers are identical dipoles, having radiation patterns, as shown in FIG. 3. The dashed line circles 26, 27 represent the W-E pattern of sonic energy generated by the transducer 21. The solid line circles 28, 29 represent the N-S pattern of sonic energy generated by transducer 22. Those who are skilled in the art will recognize these patterns as the well known cosine directional characteristics of a dipole source.

The major elements in the electrical control system (FIG. 4) are a sonic energy, power supply generator 31, an electronic control circuit 32, a readout display 33, and a pair of amplifiers 34, 35 individually driven by the separate transducers 21, 22. A pair of switches 36 control the application of sonic energy to the transducers 21, 22 via the conductors 38, 39. Both of the switches 40, 41 are here shown as having been operated to a receive mode.

The sonic energy generator 31 may be any suitable alternating current source of sonar frequency. The generator is connected to the switch contacts 42, 43 associated with the switches 40, 41, respectively. When the switches are moved away from the disclosed position, so that contacts 40, 42 and 41, 43 are closed, the switch is in a transmit position. Then, contacts 40, 41 complete a circuit from the generator 31 through the contacts 42, 43 to the transducers 21, 22. When the switches are moved back to the receive position shown in the drawing, the contacts 40, 41 complete a circuit from the transducers 21, 22 to the inputs of the amplifiers 34, 35 via the contacts 44, 45, respectively. Thus, the control circuit 32 may compare the outputs from the two transducers 21, 22 and thereby make it possible to determine the axis along which the target T lies.

The amplitude ratio of the two received signals, arriving via wires 38, 39, may be compared by any of several well known electronic techniques. The circuit details are not part of this invention; therefore, the electronic data processing circuits are only schematically illustrated by the block 32. In addition to comparing the amplitude ratios of the signals generated in the two transducers, the electronic circuitry contained in box 32 also identifies the particular transducer receiving the larger signal. Accordingly, there is a momentary operation of the switch 40 or 41 to make a connection with the power generator 31 to automatically send out a tone burst in the selected transducer for obtaining a second fix on the target.

By way of example, one method of comparing the signal levels is to rectify the output from each amplifier 34 and 35. The rectified outputs are then applied in opposite phase to a series circuit including the coils 47 and 48. Depending on which rectified signal is larger, there is a net current flow in either one of two directions through coils 47 and 48. These coils may be representative of the actuating coils in a set of polarized sensitive relays. Thus, contact is made at either 40, 42 or 41, 43, depending on the direction of the differential rectified signal.

For a further refinement of the system, both switches 40 and 41 can be simultaneously connected to contacts 42 and 43 when the signals received by the two transducers 21, 22 are approximately equal. This simultaneous operation would cause a shift in the axes of maximum radiation by plus or minus 45° with respect to the vertical axis in FIG. 3. Thus, a maximum sonic energy is sent along the 45° direction in order to get a maximum signal strength at the reflecting target. The rotation of either plus or minus 45° is determined by whether the two transducers are connected in or out of phase with each other.

Any suitable display or readout device 33 may give a presentation of the target bearing information. There are many types of display means which are well known in the art, and they do not form a part of this invention.

To operate the sonar system, either of the switches 40, 41 is operated by any suitable means to connect the output of the power supply 31 to either of the transducers 21, 22. Responsive thereto, energy is sent out along the line N-S in the pattern 28, 29 or along the line W-E in the pattern 26, 27. Thereafter, the switches operate sequentially to send out the two sonic patterns in a repeating cycle of successive operations.

Depending upon the azimuth leading toward a reflecting object and the distribution of sonic energy within the described patterns, an echo is received with a signal strength which varies as a function of the distance to the object. Except for an azimuth extending at exactly 45° with respect to any of the axes, it should be clear that one of the transducers normally receives a signal which is stronger than the signal received by the other transducer. Thus, a sequential operation of the switches 40, 41 causes the N-S and W-E patterns to appear in sequence, and the sequence enables the receipt of echos from any direction in the 360° covered by the pattern of FIG. 3. Therefore, an azimuth can be ascertained by comparing the relative strengths of echo signals received by the two transducers.

Assume, by way of example, that the reflecting object is the target T, in FIG. 3. The N-S transducer 22 picks up an echo with a relative intensity L1. The transducer 21 picks up the same echo with an intensity L2. Since the transducers have cosine directional characteristics, it follows that the ratio of the sensitivity L1/L2 represents the cotangent of the angle which describes the bearing of the target T with respect to the N-S axis. Also, the same relative sensitivities would obtain if the target were located in the opposite direction, at T', in the SW quadrant. Therefore, a single pair of transducers is only able to indicate that the target is located along the axis T-T', and it cannot show whether the target lies in a given quadrant.

Since this crossed dipole sonar system indicates only the bearing of the axis along which the target is located, it is necessary to provide two separated pairs of transducers with a known base line between them in order to remove the 180° ambiguity in the location of the target. That is, each pair gives a different bearing, and the object lies at the intersection of the two bearings.

If the target is located in either the NW or SE quadrant, the received signals produce voltages of opposite phase in each of the two transducers, as compared with the signals received in the NE or SW quadrant where the voltages generated in both transducers are in phase. Thus, by comparing the phase of the outputs from the two transducers, it is possible to determine the azimuth along which the target T lies.

After an echo is received, the controls 32 momentarily operate the switch 40 or 41 to connect the power supply generator 31 to the selected transducer which sends out a tone burst in order to obtain a second fix on the target. More particularly, the rectified outputs of amplifiers 34 and 35 are applied in opposite phase in series with the coils 47 and 48. Depending on which rectified signal is larger, the DC current flows in either of two directions through the coils. Thus, the contacts 40, 41 may move to close contacts 41, 43 or 40, 42, and the system automatically resends the stronger of the two signals when it seeks a refix on the target. Both of the switches 40 and 41 are simultaneously operated to the send position when the two transducers receive signals which are approximately equal. This shifts the axes of maximum radiation by plus or minus 45°. The maximum sonic energy is sent along an axis in the 45° direction, and this shift gives a maximum signal to the target. To select a rotation of either plus or minus 45°, it is only necessary to select whether the two transducers are connected in or out of phase with each other.

The manner of displaying the bearing information is not relevant—any suitable known equipment 33 may be used.

There is a particular advantage when the inventive system employs the inertial type, spherical transducers described in U.S. Pat. No. 3,319,220. These transducers make ideal dipole sources for operating at the lower audio frequencies (i.e. up to a few kilohertz). For efficient high power generation, their optimum radiation resistance loading occurs when the diameter of the dipole transducer is in the general vicinity of one-half wavelength of the sound being radiated. The efficiency of the transducer drops very rapidly with decreasing transducer diameter.

Preferably, the diameter of the transducer should be greater than one-fourth wavelength and in the vicinity of one-half wavelength. If the diameter is less than one-fourth wavelength, the radiation resistance loading on a dipole decreases rapidly; although, the directional pattern remains that of a dipole. Therefore, for optimum efficiency, the diameter of the dipole transducer structure should be in the approximate range of one-fourth to one-half of the wavelength of the sound being radiated.

If the electromagnetic dipole transducers are to operate in the higher audible frequencies (i.e., the audio frequencies generally above 2 or 3 kHz.), a preferable transducer is that which is illustrated in FIG. 3 of a copending application by Frank Massa, Jr., inventor, Ser. No. 817,808, filed Apr. 21, 1969, entitled Deep Water Electroacoustic Transducer, now U.S. Pat No. 3,543,230 and assigned to the assignee of this invention.

While a specific embodiment of the invention has been shown and described, it should be understood that various modifications and alternative constructions may be made without departing from the true spirit and scope of the invention. Therefore, the appended claims are intended to cover all equivalents falling within the true spirit and scope of the invention.

I claim:

1. A directional sonic detection system comprising two directional electroacoustic transducers, means for positioning said transducers in fixed axial relationship with respect to one another to transmit sonic energy in predetermined directional patterns, an electrical power source means, switching means associated with each of said transducer means for momentarily applying the output of said electrical power source means to either of said transducer means whereby the energized transducer transmits a burst of sonic energy, means associated with said two transducer means for detecting which of said two transducers receives the strongest sonic signal reflected from an object in the path of said radiated sonic energy, and means for automatically reconnecting said power source to the transducer receiving the strongest reflected signal.

2. The invention of claim 1 further characterized in that said transducers are dipoles.

3. The invention of claim 2 further characterized in that said transducers are approximately spherical in shape.

4. The invention of claim 2 further characterized in that said dipoles have a diameter within the approximate range of one-fourth to one-half the wavelength of the sonic signal being generated.

5. The invention of claim 4 further characterized in that said transducers are approximately spherical in shape.

6. A directional sonic detection system comprising two combined transmitting and receiving electroacoustic transducers having radiation patterns similar to the radiation pattern of a dipole source, means for maintaining said transducers with their axes of maximum response mutually perpendicular to each other, a source of sonar frequency power, switching means associated with said source for connecting said source to either of said transducers, and electrical control means for comparing the strength of signals appearing when sonic echo signals arrive at the individual transducers from a direction having a particular bearing with respect to the directions of the mutual perpendicular axes of maximum response.

7. The invention of claim 6 including means associated with said switching means and operated responsive to the signals appearing when said sonic echo signals arrive for activating the switching means to connect said source to the particular transducer which is receiving the stronger echo signal.

8. The invention of claim 6 and readout indicator means operated responsive to the ratio of the signal levels generated in each of the transducers for displaying the bearing to the reflecting object.

9. The invention of claim 8 and additional means associated with said indicator means for comparing the relative phase of the said signal levels, and means responsive to said phase comparison for causing said indicator means to show the angle of arrival of said sonic energy with respect to the reference location of the axes of said transducers.